United States Patent [19]

Loutfy et al.

[11] Patent Number: 4,514,482
[45] Date of Patent: Apr. 30, 1985

[54] PHOTOCONDUCTIVE DEVICES CONTAINING PERYLENE DYE COMPOSITIONS

[75] Inventors: Rafik O. Loutfy, Willowdale; Cheng-Kuo Hsiao, Mississauga, both of Canada

[73] Assignee: Xerox Corporation, Stamford, Conn.

[21] Appl. No.: 587,483

[22] Filed: Mar. 8, 1984

[51] Int. Cl.³ ............................................... G03G 5/07
[52] U.S. Cl. ......................................... 430/78; 430/58
[58] Field of Search ..................................... 430/78, 58

[56] References Cited

U.S. PATENT DOCUMENTS

| | | | |
|---|---|---|---|
| 3,871,882 | 3/1975 | Wiedemann et al. | 430/58 X |
| 4,265,990 | 5/1981 | Stolka et al. | 430/59 |
| 4,415,639 | 11/1983 | Horgan | 430/57 |
| 4,419,427 | 12/1983 | Graser et al. | 430/58 |

Primary Examiner—John D. Welsh
Attorney, Agent, or Firm—E. O. Palazzo

[57] ABSTRACT

This invention relates to improved photoresponsive devices including, for example, those comprised of (1) a supporting substrate, and (2) a photoconductive layer comprised of perylene dye compositions of the following formula:

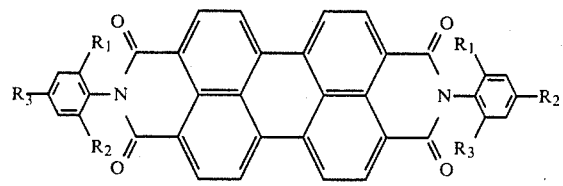

wherein $R_1$, $R_2$, and $R_3$ are independently selected from the group consisting of alkyl groups and aryl groups.

26 Claims, 6 Drawing Figures

PHOTOCONDUCTIVE DEVICES CONTAINING PERYLENE DYE COMPOSITIONS

BACKGROUND OF THE INVENTION

This invention is generally directed to photoresponsive devices, and more specifically the present invention is directed to photoresponsive imaging members, including layered members, containing certain perylene dye compositions. Thus, in one embodiment, the present invention envisions the use of certain perylene dye aggregate compositions as organic photoconductive materials in photoresponsive devices, in combination with specific hole transport layers. In one important feature of the present invention the imaging member is ambipolar, that is it can be charged either positively, or negatively. Photoresponsive devices containing the perylene compositions disclosed in combination with amine hole transport substances are useful in electrophotographic imaging systems, especially xerographic systems, wherein negatively charged, or positively charged images are developed with toner compositions of the appropriately charge.

Numerous different xerographic photoconductive members are known including, for example, a homogeneous layer of a single material such as vitreous selenium, or a composite layered device containing a dispersion of a photoconductive composition. An example of one type of composite xerographic photoconductive member is described for example, in U.S. Pat. No. 3,121,006, wherein there is disclosed finely divided particles of a photoconductive inorganic compound dispersed in an electrically insulating organic resin binder. The binder materials disclosed in this patent comprise a material which is incapable of transporting for any significant distance injected charge carriers generated by the photoconductive particles. Accordingly, as a result, the photoconductive particles must be in a substantially contiguous particle-to-particle contact throughout the layer for the purpose of permitting charge dissipation required for a cyclic operation. Thus, with the uniform dispersion of photoconductive particles described, a relatively high volume concentration of photoconductor material, about 50 percent by volume, is usually necessary in order to obtain sufficient photoconductor particle-to-particle contact for rapid discharge. This high photoconductive loading can result in destroying the physical continuity of the resinous binder, thus significantly reducing the mechanical properties thereof. Illustrative examples of specific binder materials disclosed in the U.S. Pat. No. 3,121,006 include, for example, polycarbonate resins, polyester resins, polyamide resins, and the like.

There are also known photoreceptor materials comprised of inorganic or organic materials wherein the charge carrier generating, and charge carrier transport functions, are accomplished by discrete contiguous layers. Additionally, layered photoreceptor materials are disclosed in the prior art which include an overcoating layer of an electrically insulating polymeric material. However, the art of xerography continues to advance and more stringent demands need to be met by the copying apparatus in order to increase performance standards, and to obtain higher quality images. Also, there are desired layered ambipolar photoresponsive imaging members.

Recently, there have been disclosed other layered photoresponsive devices including those comprised of separate generating layers, and transport layers, reference U.S. Pat. No. 4,265,990, and overcoated photoresponsive materials containing a hole injecting layer, overcoated with a hole transport layer, followed by an overcoating of a photogenerating layer, and a top coating of an insulating organic resin, reference U.S. Pat. No. 4,251,612. Examples of photogenerating layers disclosed in these patents include trigonal selenium and phthalocyanines, while examples of transport layers illustrated include certain diamines. The disclosures of each of these patents, namely, U.S. Pat. Nos. 4,265,990 and 4,251,612, are totally incorporated herein by reference.

Many other patents are in existence describing photoresponsive devices including layered devices containing generating substances, such as U.S. Pat. No. 3,041,167, which discloses an overcoated imaging member containing a conductive substrate, a photoconductive layer, and an overcoating layer of an electrically insulating polymeric material. This member is utilized in an electrophotographic copying method by, for example, initially charging the member, with an electrostatic charge of a first polarity, and imagewise exposing to form an electrostatic latent image which can be subsequently developed to form a visible image. Prior to each succeeding imaging cycle, the imaging member can be charged with an electrostatic charge of a second polarity, which is opposite in polarity to the first polarity. Sufficient additional charges of the second polarity are applied so as to create across the member a net electrical field of the second polarity. Simultaneously, mobile charges of the first polarity are created in the photoconductive layer such as by applying an electrical potential to the conductive substrate. The imaging potential which is developed to form the visible image, is present across the photoconductive layer and the overcoating layer.

There is also disclosed in Belgium Pat. No. 763,540, an electrophotographic member having at least two electrically operative layers, the first layer comprising a photoconductive layer which is capable of photogenerating charge carriers, and injecting the carriers into a continuous active layer containing an organic transporting material which is substantially non-absorbing in the spectral region of intended use, but which is active in that it allows the injection of photogenerated holes from the photoconductive layer and allows these holes to be transported through the active layer. Additionally, there is disclosed in U.S. Pat. No. 3,041,116, a photoconductive material containing a transparent plastic material overcoated on a layer of vitreous selenium contained on a substrate.

Furthermore, there is disclosed in U.S. Pat. Nos. 4,232,102 and 4,233,383, photoresponsive imaging members comprised of trigonal selenium doped with sodium carbonate, sodium selenite, and trigonal selenium doped with barium carbonate, and barium selenite or mixtures thereof.

Additionally, the use of squaraine pigments in photoresponsive imaging devices is known, reference, for example, the disclosure contained in a co-pending application wherein there is described an improved photoresponsive device containing a substrate, a hole blocking layer, an optional adhesive interface layer, an organic photogenerating layer, a photoconductive composition capable of enhancing or reducing the intrinsic properties of the photogenerating layer, and a hole transport layer. As photoconductive compositions for this device there can be selected various squaraine pigments, including hydroxy squaraine compositions. Moreover, there is disclosed in U.S. Pat. No. 3,824,099, certain photosensitive hydroxy squaraine compositions. According to the disclosure of this patent the squaraine compositions are photosensitive in normal electrostatographic imaging systems.

The use of certain selected perylene pigments as photoconductive substances is also known. There is thus described in Hoechst, European Patent Publication No. 0040402, BE3019326, filed 5/21/80, the use of N,N'-disubstituted perylene 3,4,9,10, tetracarboxyl diimide pigments as photoconductive substances. Specifically there is disclosed in this publication dual layered photoreceptors, with improved spectral response in the wavelength region of 400 to 700 nanometers containing evaporated N,N'-bis(3-methoxypropyl)perylene-3,4,9,10 tetracarboxyldiimide. It is important to note that these perylenes are insoluble pigments, accordingly photoconductive devices with such compositions must be prepared by costly and complex vacuum evaporation techniques. A similar disclosure is contained in Ernst Junther Schlosser, Journal of Applied Photographic Engineering, Vol. 4, No. 3, page 118 (1978). Also dual layered photoreceptors prepared from the perylene pigments as described in the above mentioned No. 0040402 publication can only be charged negatively thus requiring the use of positively charged toner compositions.

Moreover, there is disclosed in U.S. Pat. No. 4,419,427 electrophotographic recording mediums with a photosemiconductive double layer comprised of a first layer containing charge carrier producing dyes, and a second layer containing one or more compounds which are charge carrier transporting materials when exposed to light wherein perylene diimides are employed as the charge carrier producing dyes, reference the disclosure in Column 2, beginning at line 50. Also of interest is the background information included in Columns 1 and 2 and particularly in Column 2, beginning at line 20 wherein perylene dyes of the formula as shown are illustrated, which dyes are substantially similar to the dyes selected for the photoresponsive devices of the present invention. Examples of charge carrier transporting compounds disclosed in the U.S. Pat. No. 4,419,427 include pyrazoline derivatives, oxazoles materials, triphenylamine derivatives, carbazole derivatives, and pyrene derivatives, as well as other materials, reference the disclosure in Column 4, beginning at line 1.

While photoresponsive imaging members containing the abovedescribed compositions may be suitable for their intended purposes, there continues to be a need for the development of improved members or devices, particularly layered devices. Additionally, there continues to be a need for imaging members comprised of specific amine charge transport compositions and perylene dye photogenerating materials possessing desirable sensitivity, low dark decay, high charge acceptance values, and wherein these members can be used for a number of imaging cycles in a xerographic imaging apparatus, or in printing devices. Further, there continues to be a need for photoresponsive devices which are ambipolar, thus permitting both normal and reverse copying of black and white, or color images. These devices which generate both positive and negative charges, that is both holes and electrons, can be repeatedly used in a number of imaging cycles without deterioration thereof from the machine environment or surrounding conditions. Moreover, there continues to be a need for improved layered imaging members wherein the materials selected are substantially inert to users of these members. Furthermore, there continues to be a need for layered device which can be charged positively only, negatively only, or are ambipolar. Also, there continues to be a need for photoconductive materials which can be fabricated into imaging devices by simple coating techniques, and wherein these materials are preferably soluble in common coating solvents, and are compatible with the resinous binder resins selected.

SUMMARY OF THE INVENTION

It is an object of the present invention to provide improved photoresponsive imaging members which overcome the above noted disadvantages.

It is yet another object of the present invention to provide ambipolar photoresponsive devices.

A further specific object of the present invention is the provision of an improved photoresponsive member containing a photoconductive layer comprised of perylene dyes.

It is yet another object of the present invention to provide an improved overcoated photoresponsive device containing a diamine hole transport layer, and a photoconductive layer containing perylene dye compositions.

In yet another object of the present invention, there is provided a layered photoresponsive member containing as a top layer a perylene dye or a naphthalene dye dissolved in a resinous binder composition and a transporting layer comprised of certain diamines.

Another object of the present invention resides in the provision of an improved photoresponsive member containing as the photoconductive material the perylene dyes of the present invention, and wherein these devices are useful in positively charged or negatively charged xerographic imaging systems.

In yet another embodiment of the present invention, there are provided imaging and printing methods with the improved photoresponsive imaging members described herein.

These and other objects of the present invention are accomplished by the provision of photoresponsive imaging members or devices containing known perylene dye compositions of the following formula:

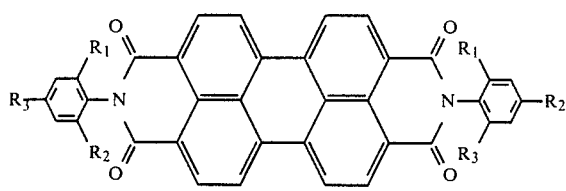

wherein $R_1$, $R_2$, and $R_3$ are independently selected from the group consisting of alkyl substituents and aryl substituents, and hole transporting layers comprised of specific diamine compositions.

Examples of alkyl groups include those containing of from about 1 to about 20 carbon atoms, and preferably from 1 to about 7 carbon atoms, such as methyl, ethyl, propyl, butyl, hexyl, heptyl, octyl, nonyl, pentyl, and the like, with methyl, ethyl, propyl and butyl being preferred. Moreover, the alkyl groups can be substituted with other substituents providing that the objectives of the present invention are achieved, these substituents including, for example, halogen, aryl, nitro, and the like. Each of the R substituents can be comprised of identical alkyl groups, or each of the R substituents may be different alkyl groups. Thus, for example, $R_1$ on the first ring structure may be a methyl group, while $R_1$ on the second ring structure is butyl. Likewise, $R_2$ or $R_3$ on the first ring structure may be methyl and propyl, respectively, while $R_2$ an $R_3$ on the second ring structure may be methyl and butyl, respectively. Additionally, all of the R groupings can be the alkyl group methyl, propyl or butyl, for example.

Illustrative examples of aryl groups include those containing from about 6 to about 24 carbon atoms, such as phenyl, napthyl, anthracyl, and the like, with phenyl being preferred. Additionally, the aryl groups can be substituted with substituents such as alkyl as defined herein, halogen, and the like. As is the situation with the alkyl substituents, the aryl groups can be comprised of the same substituents, thus $R_1$ on the first ring structure and $R_1$ on the second ring structure can be phenyl. Similarily, $R_2$ and $R_3$ on the first ring structure can be a phenyl group, while $R_2$ and $R_3$ on the second ring structure are also phenyl substituents. Also, $R_1$ on the first ring structure may be a phenyl substituent, while $R_1$ on the second ring structure is a napthyl substituent.

Illustrative specific examples of perylene dyes included within the scope of the present invention and embraced by the above formula are N,N'-di(2'4'6'-trimethyl phenyl)perylene3.4.9.10tetracarboxyldiimide, N,N'-di(para-dimethylaminophenyl)perylyene3,4,9,10tetracarboxyldiimide, N,N'-di(N-butyl)-perylyene3,4,9,10tetracarboxyldiimide, N,N'-di(2',4'-ditertiarybutylphenyl)perylyene3,4,9,10tetracarboxyldiimide, N,N'-di(2',5'-ditertiarybutylphenyl)-perylyene3,4,9,10tetracarboxyldiimide, N,N'-di(2',6'-dimethylphenyl)perylyene3,4,9,10tetracarboxyldiimide, N,N'-di(2',6'-dimethyl-4'-tertiarybutylphenyl)-perylyene3,4,9,10tetracarboxyldiimide, N,N'-di(2'-tertiarybutylphenyl)perylyene3,4,9,10tetracarboxyldiimide, N,N'-di(2',4',6'-trimethoxyphenyl)-perylyene3,4,9,10tetracarboxyldiimide, N,N'-di(2,5-dichlorophenyl)perylyene3,4,9,10tetracarboxyldiimide, and N,N'-di(2,methyl-4-chlorophenyl)perylyene3,4,9,10tetracarboxyldiimide, and the like.

The perylene compositions illustrated herein are generally prepared by the condensation reaction of perylene 3,4,9,10 tetracarboxylic acid or its corresponding anhydrides with trisubstituted anilines in quinoline, in the presence of a catalyst, and with heating at elevated temperatures, as described for example in German Patent Publications Nos. 2,454,1780?, 2,451,781, 2,451,783, 2,451,783, 2,451,784, 2,451,782, 3,016,765, French Pat. No. 7,723,888 and British Pat. Nos. 857,130, 901,694, and 1,095,196, the disclosure of each of the aforementioned patents and patent publications being totally incorporated herein by reference.

More specifically, the perylene dyes of the present invention can be prepared by heating the respective reactants to a temperature of between about 180 degrees centigrade to about 230 degrees centigrade in the presence of a zinc chloride catalyst as illustrated in the following equation:

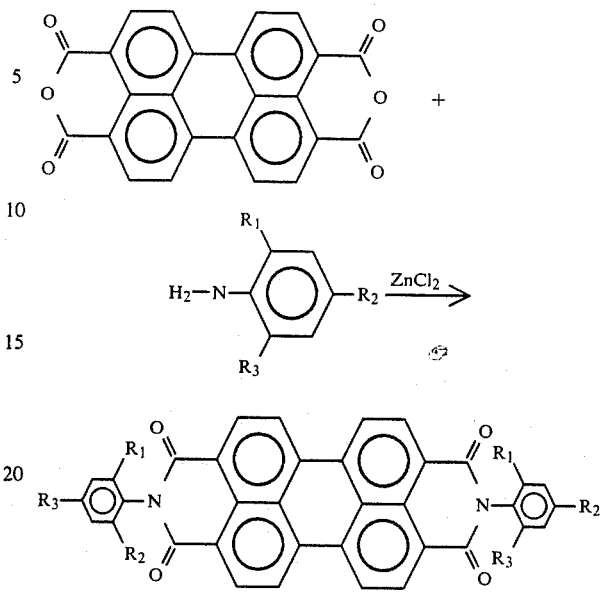

wherein $R_1$, $R_2$, and $R_3$ are as defined herein.

In one illustrative embodiment, the perylene dyes of the present invention are prepared by the condensation reaction of perylene 3,4,9,10 tetracarboxylic acid, or its corresponding anhydrides with trisubstitued anilines in a molar ratio of from about 1:2 to about 1:10 and preferably in a ratio of from about 1:2 to about 1:3. The reaction is generally accomplished at a temperature of from about 180 degrees centigrade to about 230 degrees centigrade and preferably at a temperature of about 210 degrees centigrade with stirring until the reaction is completed. Subsequently, the desired product is isolated from the reaction mixture by known techniques such as filtration, and identified by analytical tools including NMR, mass spectroscopy, and elemental analysis for carbon, hydrogen, oxygen, and nitrogen.

Examples of acid, and anhydride reactants include perylene 3,4,9,10-tetracarboxylic acid, perylene 3,4,9,10-tetracarboxylic acid dianyhdride, naphthalene 1,4,5,8,tetracarboxylic dianyhdride, pyromellitic dianyhdride, and the like.

Examples of trisubstituted anilines reactants include 2,4,6-trimethylaniline, 2,6-dimethylaniline and N,N-dimethyl-paraphenylenediamine, 2,6dimethyl-4-tertiarybutylaniline, 2-tertiarybutylaniline, 2,4,6-trimethoxyaniline, 2,5-dichloroaniline, 2-methyl-4-chloroaniline, 2,5-ditertiarybutylaniline, and the like. Also useful are aliphatic amines including N-butyl amine, cyclohexyl amines, adamantyl amine, and the like.

Catalysts that can be used include known effective materials, suchas anhydrous zinc chloride, anhydrous zinc acetate, zinc oxide, and the like.

Numerous different layered photoresponsive devices containing the perylene dyes illustrated herein can be fabricated. In one embodiment, the layered photoresponsive devices are comprised of a supporting substrate, containing a coating thereover of the perylene dyes illustrated, admixed with a specific hole transporting substance, and a polymeric binder. The ratio of the perylene dye to the transporting substance varies and is dependent upon a number of factors, however, generally this ratio is from about 1:1 to about 1:20, and preferably is from about 1:15 to about 1:2. The ratio of dye/- hole transport molecule dispersed in the inactive resinous binder polymer varies from about 1:1 to 1:2, and preferably is from about 1:1.1 to about 1:1.5. These devices are ambipolar and can be charged either positively or negatively.

Moreover, there is provided in accordance with the present invention an improved negatively charged photoresponsive device, comprised of a supporting substrate, a photoconductive layer comprised of the perylene dyes of the present invention admixed with a hole transporting material dispersed in a polymeric resinous binder composition, and as a top layer specific diamine hole transporting substance dispersed in an inactive resinous binder.

In another embodiment of the present invention there is provided a photoconductive device comprised of a supporting substrate, a specific diamine transporting layer of a material capable of transporting positive charges, and as a top coating the perylene dyes illustrated, or naphthylene dyes, dispersed in an inactive resinous binder. This device is particularly useful in positively charged imaging modes.

The improved photoresponsive devices of the present invention can be prepared by a number of known methods, the process parameters and the order of coating of the layers being dependent on the device desired. Thus, for example, a three layered photoresponsive member can be prepared by vacuum sublimation of the photoconducting layer on a supporting substrate, and subsequently depositing by solution coating the hole transport layer. In another process variant, the layered photoresponsive device can be prepared by providing a conductive substrate, and applying thereto by solvent coating processes, laminating processes, or other methods, the perylene dye photoconductive composition.

The improved photoresponsive imaging members or devices of the present invention can be incorporated into various imaging systems, such as those conventionally known as xerographic imaging processes. Additionally, the improved photoresponsive devices of the present invention containing an inorganic photogenerating layer, and a photoconductive layer comprised of the perylenes of the present invention can function simultaneously in imaging and printing systems.

BRIEF DESCRIPTION OF THE DRAWINGS

For a better understanding of the present invention and further features thereof, reference is made to the following detailed description of various preferred embodiments wherein.

DESCRIPTION OF THE PREFERRED EMBODIMENTS

Figure 1:
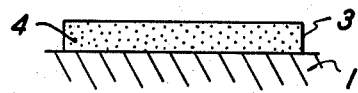
FIG. 1 is a partially schematic cross-sectional view of the photoresponsive member of the present invention.

Illustrated in FIG. 1 is the ambipolar photoresponsive imaging member or device of the present invention comprised of a substrate 1, and a photoconductive layer 3, comprised of the perylene dyes illustrated herein, preferably admixed with a diamine hole transporting substance in a ratio of from about 1:1 to about 1:20, optionally dispersed in a resinous binder composition 4.

Figure 2:
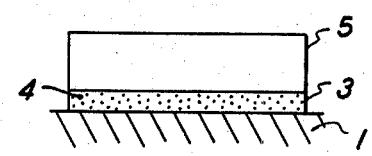
FIG. 2 is a partially schematic cross-sectional view of the photoresponsive member of the present invention.

Illustrated in FIG. 2 is essentially the same device as illustrated in FIG. 1, with the exception that there is further included as a top layer 5, specific diamine hole transporting materials dispersed in an inactive resinous binder 6. This device is primarily useful in a negative charging mode.

Figure 3:
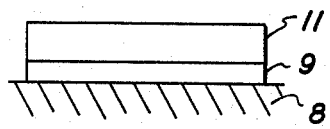
FIG. 3 is a partially schematic cross-sectional view of photoresponsive members of the present invention.

Illustrated in FIG. 3 is an improved photoresponsive device of the present invention, comprised of a substrate 8, a diamine hole transport layer 9, and a top overcoating layer 11 comprised of the perylene dyes illustrated herein. In this embodiment the photoconductive or photogenerating dye is usually comprised of the perylene dye dispersed in a resin, and preferably admixed with a diamine hole transporting substance.

Figure 4:
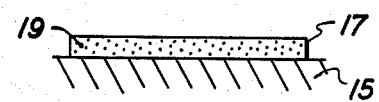
FIGS. 4, 5, and 6, are a partially schematic cross-sectional views of photoresponsive members of the present invention.

Illustrated in FIG. 4 is one preferred ambipolar photoresponsive device of the present invention, wherein the substrate 15 is comprised of aluminum in a thickness of 3 mils, containing thereover in a thickness of 5 to 25 microns a layer 17 of a photoconductive composition comprised of the perylene dye N,N'-di(2'4'6'-trimethyl phenyl)perylene 3.4.9.10 tetracarboxyldiimide, in an amount of 18 percent by weight, admixed with 27 percent by weight of N,N'-diphenyl-N,N'-bis(3-methylphenyl)-[1,1'-biphenyl]-4,4'-diamine, dispersed in 55 percent by weight of a polycarbonate resinous binder 19.

Figure 5:
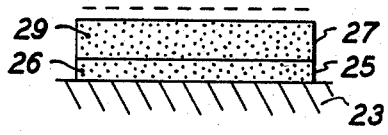

Illustrated in FIG. 5 is a negatively charged photoresponsive device of the present invention comprised of an aluminum substrate 23 in a thickness of 3 mils, containing thereover in a thickness of 0.1 to 5 microns a layer of photoconductive composition 25, comprised of perylene dye N,N'-di(2'4'6'-trimethyl phenyl)perylene 3.4.9.10 tetracarboxyldiimide, in an amount of 18 percent by weight, admixed with percent 27 by weight of N,N'-diphenyl-N,N'-bis(3-methylphenyl)-[1,1'-biphenyl]-4,4'-diamine, dispersed in 55 percent by weight of a polycarbonate resinous binder 26, and as an overcoating layer in a thickness of 25 microns the hole transporting material N,N'-diphenyl-N,N'-bis(3-methylphenyl-[1,1'-biphenyl]-4,4'-diamine, dispersed in 50 percent by weight of a polycarbonate resinous binder 29.

Figure 6:
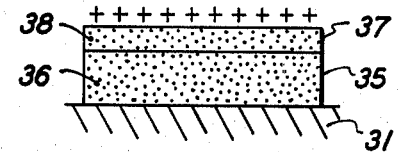

Illustrated in FIG. 6 is a positively charged photoresponsive device of the present invention comprised of an aluminum substrate 31, in a thickness of 3 mils, a hole transporting layer 35, comprised of N,N'-diphenyl-N,N'-bis(3-methylphenyl)-[1,1'-biphenyl]-4,4'-diamine dispersed in a polycarbonate resinous binder 36, and a photoconductive layer 37 comprised of the perylene dye N,N'-di(2'4'6'-trimethyl phenyl)perylene 3,4,9,10 tetracarboxyldiimide, in an amount of 18 percent by weight, admixed with 27 percent by weight of N,N'-diphenyl-N,N'-bis(3-methylphenyl)-[1,1'-biphenyl]-4,4'-diamine, dispersed in 55 percent by weight of a polycarbonate resinous binder 38.

The substrate layers may be opaque or substantially transparent, and may comprise any suitable material having the requisite mechanical properties. Thus the substrate may comprise a layer of insulating material such as an inorganic or organic polymeric material, including Mylar ® a commercially available polymer; a layer of an organic or inorganic material having a semiconductive surface layer such as indium tin oxide, or aluminum arranged thereon, or a conductive material such as, for example, aluminum, chromium, nickel, brass or the like. The substrate may be flexible or rigid and many have a number of many different configurations, such as, for example, a plate, a cylindrical drum, a scroll, an endless flexible belt and the like. Preferably, the substrate is in the form of an endless flexible belt. In some situations, it may be desirable to coat on the back of the substrate, particularly when the substrate is an organic polymeric material, an anti-curl layer, such as for example, polycarbonate materials commercially available as Makrolon.

The thickness of the substrate layer depends on many factors, including economical considerations, thus this layer may be of substantial thickness, for example, over 100 mils, or of minimum thickness, providing there are no adverse effects on the system. In one preferred embodiment the thickness of this layer ranges from about 3 mils to about 10 mils.

A very important layer for the photoresponsive device of the present invention is the perylene dye photoconductive layer comprised of the compositions disclosed herein. These compositions are generally electronically compatible with the charge carrier transport layer, in order that photoexcited charge carriers can be injected into the transport layer, and further in order that charge carriers can travel in both directions across the interface between the photoconductive layer and the charge transport layer. Also these dyes are electron acceptors, and transport negative charges.

Generally, the thickness of the perylene photoconductive layer depends on a number of factors including the thicknesses of the other layers, and the percent mixture of photoconductive material contained in this layer. Accordingly, this layer can range in thickness of from about 0.05 microns to about 50 microns when the photoconductive perylene composition is present in an amount of from about 5 percent to about 100 percent by volume, and preferably this layer ranges in thickness of from about 0.25 microns to about 10 microns, when the photoconductive perylene composition is present in this layer in an amount of 30 percent by volume. The maximum thickness of this layer is dependent primarily upon factors such as mechanical considerations, for example whether a flexible photoresponsive device is desired.

The photogenerating or the photoconductive materials can comprise 100 percent by weight of the respective layers, or these materials can be dispersed in various suitable resinous polymer binder materials, in amounts of from about 5 percent by weight to about 95 percent by weight, and preferably in amounts of from about 25 percent by weight to about 75 percent by weight. Illustrative examples of polymeric binder resinous materials that can be selected include those as disclosed, for example, in U.S. Pat. No. 3,121,006, the disclosure of which is totally incorporated herein by reference, polyesters, polyvinyl butyral, Formvar ®, polycarbonate resins, polyvinyl carbazole, epoxy resins, phenoxy resins, especially the commercially available poly(hydroxyether) resins, and the like.

The charge carrier transport material may be incorporated into the perylene photoconductive layer in amounts, for example, of from about zero weight percent to about 60 weight percent.

With respect to the charge carrier transport material selected, reference layer g of FIG. 3, for example, which layer is generally of a thickness of from about 5 microns to about 50 microns, and preferably from about 10 microns to about 40 microns, it is comprised of molecules of the formula:

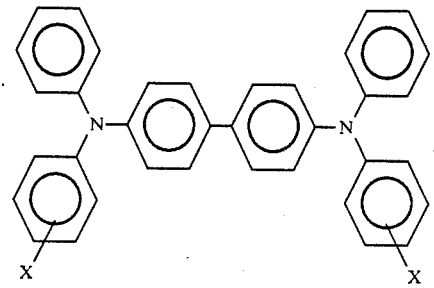

dispersed in a highly insulating and transparent organic resinous binder wherein X is an alkyl group of from about 1 to about 6 carbon atoms, or a halogen, especially those substituents selected from the group consisting of (ortho) $CH_3$, (meta) $CH_3$, (para) $CH_3$, (ortho) Cl, (meta) Cl, (para) Cl. The highly insulating resin, has a resistivity of at least $10^{12}$ ohm-cm to prevent undue dark decay. However, the resin becomes electrically active when it contains from about 10 to 75 weight percent of the substituted N,N,N',N'-tetraphenyl[1,1-biphenyl]4-4'-diamines corresponding to the foregoing formula.

Compounds corresponding to the above formula include, for example, N,N'-diphenyl-N,N'-bis(alkylphenyl)-[1,1-biphenyl]-4,4'-diamine wherein alkyl is selected from the group consisting of methyl such as 2-methyl, 3-methyl and 4-methyl, ethyl, propyl, buyl, hexyl and the like. With chloro substitution, the amine is N,N'-diphenyl-N,N'-bis(halo phenyl)-[1,1'-biphenyl]-4,4'-diamine wherein the halo atom is 2-chloro, 3-chloro or 4-chloro.

Examples of the highly insulating and transparent resinous material or inactive binder resinous material selected for the diamine transport substances include the materials such as those described in U.S. Pat. No. 3,121,006 the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight (Mw) of from about 20,000 to about 100,000 with a molecular weight in the range of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also included within the scope of the present invention are methods of imaging with the photoresponsive devices illustrated herein. These methods of imaging generally involve the formation of an electrostatic latent image on the imaging member, followed by developing the image with a suitable toner composition, subsequently transferring the image to a suitable substrate and permanently affixing the image thereto. In those environments wherein the device is to be used in a printing mode, the imaging method involves the same steps with the exception that the exposure step can be accomplished with a laser, device, or image bar, in addition to a broad spectrum white light source.

The invention will now be described in detail with reference to specific preferred embodiments thereof, it being understood that these examples are intended to be illustrative only. The invention is not intended to be limited to the materials, conditions, or process parameters recited herein, it being noted that all parts and percentages are by weight unless otherwise indicated.

EXAMPLE I

There was dissolved in 45 milliliters of quinoline, 8.49 grams of 3,4,9,10-perylene tetracarboxylic dianhydride, 11.7 grams 2,4,6-trimethylaniline, and 1.73 grams zinc acetate. The resulting mixture was then heated for four hours at 205°–210° C. After cooling to room temperature, the resulting solid reaction product was filtered, washed with hot ethyl alcohol (100 ml) and dried in a vacuum oven at room temperature overnight, yielding 8.83 grams (65.3%) of N,N'-bis(2,4,6-trimethylphenyl)-perylene 3,4,9,10-tetracarboxyl diimide (as described in DE No. 30 16 765 A1) of the following formula which was characterized by IR, UV-VIS and fluorescence spectroscopy as well as elemental analysis and electrochemical measurements. The product was purified by carrier gas sublimation (trainsublimation) technique described by H. J. Wagner, R. O. Loutfy and C. K. Hsiao, J. Mat. Sci., 17, 2781 (1982), yielding large violet crystals.

Analysis: $C_{42}H_{30}O_4N_2$ (Molecular weight 626), Found: 80.55% C 5.32% H 4.36% N 9.90% O, Calculated: 80.51% C 4.79% H 4.47% N 10.22% O.

UV($CH_2Cl_2$)(nm)(log e): 524(4.85), 488(4.64), 459(4.2). Fluorescence ($CH_2Cl_2$)(nm): 538, 577 and 650. Fluorescence Quantum Yield ($CH_2Cl_2$): 0.91.

Electrochemical Half-Wave Reduction Potential ($CH_2Cl_2$): $E_{\frac{1}{2}}(I) = -0.44$ Volts vs Ag/AgCl Reference Electrode $E_{\frac{1}{2}}(II) = -0.67$ Volts vs Ag/AgCl Reference Electrode

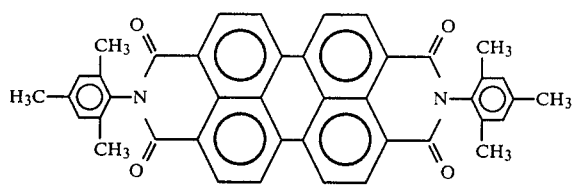

EXAMPLE II

There was dissolved in 40 milliliters of quinoline, 5 grams of 3,4,9,10-perylene tetracarboxylic dianhydride, 6.9 grams of N'N'-dimethyl p-phenylene diamine, and 2 grams of zinc acetate. The mixture was then heated to boiling for five hours, followed by cooling to room temperature. The solid brown product was filtered and washed with hot ethyl alcohol (150 ml) and dried in a vacuum oven. The product, N'N'-bis(4-dimethylaminophenyl)perylene 3,4,9,10-tetracarboxyl diimide, of the following formula was obtained in a yield of (70%) and was characterized by spectroscopic and elemental analysis techniques, as described in Example I.

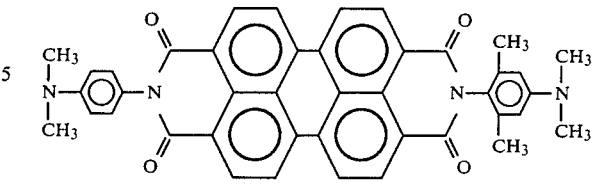

EXAMPLE III

There was dissolved in 40 milliliters of quinoline, 3.4 grams of 1,4,5,8-naphthelene tetracarboxylic dianhydride, 7.5 grams of 2,4,6-trimethylaniline, and 2.2 grams zinc acetate. The mixture was then heated to 195° C. for seven hours. After cooling to room temperature, the precipitated reaction product was filtered and washed with hot ethyl alcohol (150 ml) followed by drying in a vacuum oven overnight. The product, N'N'-bis(2,4,6-trimethylphenyl)naphthalene 1,4,5,8-tetracarboxyl diimide of the following formula was obtained in 6 percent yield. The solid product was purified by train sublimation and characterized by absorption spectroscopy, electrochemistry and elemental analysis.

Analysis: $C_{32}H_{26}O_4N_2$ (M. Wt 502), Found: 76.6% C 5.31% H 5.52% N 12.64% O, Calculated: 76.5% C 5.18% H 5.58% N 12.76% O.

UV($CH_2Cl_2$): 454, 432 nm.

Electrochemical Half-Wave Reduction Potential ($CH_2Cl_2$): $E_{\frac{1}{2}}(I) = -0.46$ Volts vs Ag/AgCl Reference Electrode, $E_{\frac{1}{2}}(II) = -0.95$ Volts vs Ag/AgCl Reference Electrode.

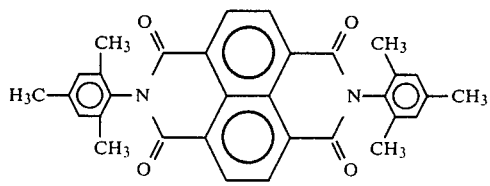

EXAMPLE IV

The procedure of Example III was repeated with the exception that the 2,4,6-trimethylaniline was replaced by n-butyl amine, and there resulted the product N,N'-bis(n-butyl)naphthalene 1,4,5,8-tetracarboxyl diimide, of the following formula in a yield of 75 percent.

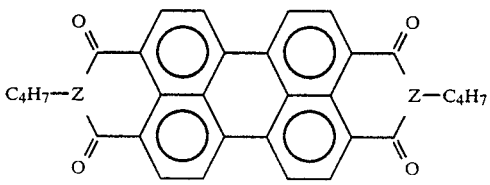

The absorption and electrochemical properties of this composition are similar to the naphthalene diimide product of Example III, however, the butylmaterial is much more soluble in common organic solvents.

Electrochemical Half-Wave Reduction Potential ($CH_2Cl_2$): $E_{\frac{1}{2}}(I) = -0.60$ Volts vs Ag/AgCl Reference Electrode, $E_{\frac{1}{2}}(II) = -1.02$ Volts vs Ag/AgCl Reference Electrode.

EXAMPLE V

In 36 milliliters of quinoline, 4.2 grams of pyromellitic dianhydride, 10.1 grams of 2,4,6-trimethylaniline and 3.5 grams of zinc acetate were mixed, and heated to 195° C. for 7.5 hours. After cooling the mixture to room temperature, the solid reaction product was filtered, washed with hot ethyl alcohol (100 ml) and dried in a vacuum oven overnight. The product, N,N′-bis(2,4,6-trimethylphenyl)pyromellitic diimide of the following formula was purified by train sublimation to yield light yellow crystals.

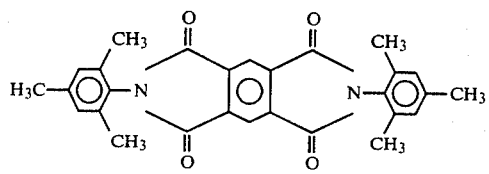

Electrochemical Half-Wave Reduction Potential ($CH_2Cl_2$): $E_{\frac{1}{2}}(I) = -0.77$ Volts vs Ag/AgCl Reference Electrode, $E_{\frac{1}{2}}(II) = -1.42$ Volts vs Ag/AgCl Reference Electrode.

Preparation and Testing of Photoconductive Members Containing Electron Accepting Dyes and an Electron Donor Molecule

EXAMPLE VI

There was dissolved in 50 milliliters of dichloromethane, 5.3 grams of a polycarbonate resin (Merlon 60). To this solution, 2.9 grams of the hole transport molecule. N,N′-diphenyl-N,N′-bis(3-methylphenyl)-[1,1′-biphenyl]-4,4′-diamine were added and the resulting mixture stirred until solution was completed. To 10 ml of this solution was added 0.18 gram of the perylene dye, N,N-bis(2,4,6-trimethylphenyl)perylene 3,4,9,10-tetracarboxyl diimide as prepared in accordance with Example I. When the dye had dissolved, the mixture was coated onto a thin aluminum sheet and dried, yielding a deep orange film of 20 microns thickness.

The photosensitivity of the above prepared member, as well as the following members, was then determined as follows. The surface of the layer away from the aluminum support was electrostatically charged under a corona discharge source until the surface potential as measured by a capacitively coupled probe attached to an electrometer attained an initial dark value, $V_O$. The front surface of the charged element was then exposed to light from a filtered Xenon lamp (XBO 75 watt, Osram source) allowing light in the wavelength range of 400–700 nm to reach the sample surface. The exposure causing reduction of the surface potential to half its initial value, $E_{\frac{1}{2}}$, was determined as well as the percent discharge of surface potential due to various exposure energies was also determined. The photosensitivity can be considered equivalent to the exposure in ergs/cm² necessary to discharge the element from the initial surface potential to half that value.

The photosensitivity of the above member (unexposed to solvent vapor) is listed in the following table:

| Initial Potential ($V_O$)(Volts) | Dark Decay (Volts/Sec) | % Discharge (136 ergs/cm²) | $E_{\frac{1}{2}}$ (ergs/cm²) |
| --- | --- | --- | --- |
| +390 | 80 | 37 | 350 |
| −400 | 100 | 20 | <500 |

This device is photosensitive, either in a positive or negative charging mode as the surface potential can be light modulated. Specifically, for example, the exposure required to reduce the surface potential, (+390 volts) to one-half this value, (195 volts), is 350 ergs/cm².

When the above device was fumed for 15 minutes with 1,1,2-trichloroethane vapor the color of the film changed to deep red. The absorption Spectrum 1 for the untreated member or device had peaks at 530, 490 and 465 nm, while the Spectrum 2 for the 1,12-trichloroethane fumed film is shifted with peaks at 555,510 and a shoulder at 470 nm.

The photosensitivity of the fumed member was then determined as indicated herein, and found to be higher than the "unfumed" member as shown in the following table in that the $E_{\frac{1}{2}}$ ergs/cm² is 80 and 120, respectively, thus less light was required to reduce the surface potential to one half of its value, compared to 350, and greater than 500 for the unfumed member.

| Initial Potential ($V_O$)(Volts) | Dark Decay (Volts/Sec) | % Discharge (136 ergs/cm²) | $E_{\frac{1}{2}}$ (ergs/cm²) |
| --- | --- | --- | --- |
| +850 | 57 | 68 | 80 |
| −650 | 100 | 55 | 120 |

For the purpose of comparison, a commercially available conventional double layer photoconductive element consisting of a thin (1,000 Angstroms) evaporated film of N-N′-bis(methyl)perylene 3,4,9,10-tetracarboxyl diimide pigment as charge generator, and a thick (10 mm) hole transport layer of 2,5-bis(p-diethylaminophenyl) 2,3,4-oxidiezol dispersed in a polyester resin was fabricated, and the photosensitivity thereof compared with the (10 mm) single layer photoconductive element of the present invention, consisting of 20 percent by weight of N,N′-bis(2,4,6-trimethylphenyl)perylene 3,4,9,10-tetracarboxyl diimide, 30% N,N′-diphenyl-N,N′-bis(3-methylphenyl)-[1,1′-biphenyl]-4,4′-diamine and 50 percent by volume of a polycarbonate resin. While the double layer photoconductive element can be charged and discharged with negative charging only, the single layer photoconductive element was ambipolar, as illustrated by the following data.

| | $V_O$ (Volts) | $V_{residual}$ (Volts) | Relative Sensitivity (400–700 nm) | $E_{\frac{1}{2}}$ (ergs/cm²) |
| --- | --- | --- | --- | --- |
| Double Layer Photoreceptor | −720 | 50 | 1.0 | 25 |
| Single Layer Photoreceptor | +700 | 10 | 0.4 | 75 |
| Single Layer Photoreceptor | −650 | 20 | 0.21 | 120 |

The double layer could not be charged positively.

EXAMPLE VII

This example demonstrates the relative photosensitivity modification obtained by changing the relative concentration of the sensitizing perylene dye in the photoconductive element of Example VI. A series of single layer (15 mm) members were prepared by repeating the process as described in Example VI with the hole transport (electron donor) N,N'-diphenyl-N,N'-bis(3-methylphenyl)-[1,1'-biphenyl]-4,4'-diamine, polycarbonate resin and the sensitizing dye N,N'-bis(2,4,6-trimethylphenyl)perylene 3,4,9,10-tetracarboxyl diimide. The dye concentration was varied from 1 to 30% by weight. The photosensitivity after fuming as described in Example VI of these elements were determined as described above and the results are shown in the following table:

| $V_O$ (Volts) | Dye | Weight % Hole Transport | Polycarbonate | Relative Sensitivity (400–700 nm) | $E_{\frac{1}{2}}$ (ergs/cm$^2$) |
|---|---|---|---|---|---|
| +660 | 5 | 35 | 60 | 0.58 | 138 |
| +700 | 18 | 29 | 53 | 1.00 | 80 |
| +750 | 20 | 30 | 50 | 1.00 | 79 |
| +620 | 26 | 27 | 47 | 0.60 | 133 |

EXAMPLE VIII

Dual-layer photoconductive elements were prepared consisting of a 2 mm (range 0.1–3.0 mm) of the perylene photoconductive composition of Example I by repeating the procedure of Example VI, as a charge-generation layer overcoated with a thick (17 mm) (range 5–100 mm) charge transport layer of (1:1) N,N'-diphenyl-N,N'-bis(3-methylphenyl)-[1,1'-biphenyl]-4,4'-diamine in polycarbonate (Makrolon, Bayer). This double layer photoconductive element was charged negatively and was photosensitive to light in the wavelength region of 400 to 700 nm, $E_{\frac{1}{2}}$ (ergs/cm$^2$) = 300.

EXAMPLE IX

A photoresponsive device was prepared by repeating the procedure of Example VIII, with the exception that the charge generating layer was overcoated on top of the charge transport layer. The resulting device was positively charged and was photosensitive to light in the wavelength region of 400–700 nanometers (nm).

EXAMPLE X

A photoresponsive device was prepared by repeating the procedure of Example VI, with the exception that the sensitizing dye selected was N,N'-bis(p-dimethylaminophenyl)perylene 3,4,9,10-tetracarboxyl diimide and such a device had substantially similar photosensitivity as the device of Example VI.

EXAMPLE XI

Three grams of polyvinyl carbazole were dissolved in 50 ml of methylene chloride. To 5 ml of this solution, 0.3 grams of N,N'-bis(2,4,6-trimethylphenyl)naphthalene 1,4,5,8-tetracarboxyl diimide was added and stirred until dissolved. The solution was coated onto a thin sheet of aluminum to give a 12 mm single layer photoconductor. This photoconductive element subsequent to fuming as described in Example VI was charged both positively and negatively and exposed to light which is absorbed by the sensitizier dye only yielding the following data:

| $V_O$ (Volts) | Dark Decay (Volts/Sec) | Photosensitivity $E_{\frac{1}{2}}$ (ergs/cm$^2$) |
|---|---|---|
| +710 | 22 | 120 |
| −550 | 25 | 330 |

Although the invention has been described with reference to specific preferred embodiments, it is not intended to be limited thereto, rather those skilled in the art will recognize variations and modifications may be made therein which are within the spirit of the invention and within the scope of the following claims.

We claim:

1. An improved photoresponsive device comprised in the order stated of (1) a supporting substrate, and (2) a photoconductive layer comprised of perylene dye compositions of the following formula:

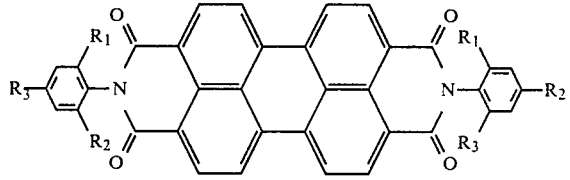

wherein $R_1$, $R_2$, and $R_3$ are independently selected from the group consisting of alkyl groups and aryl groups.

2. An improved photoresponsive device comprised in the order stated of (1) a supporting substrate, (2) a photoconductive layer comprised of the perylene compositions of claim 1, and (3) a diamine hole transport layer.

3. An improved photoresponsive device comprised in the order stated of (1) a supporting substrate, (2) a diamine hole transport layer, and (3) a photoconductive layer comprised of the perylene compositions of claim 1.

4. An improved photoresponsive device in accordance with claim 1 wherein the perylene composition is N,N'-di(2,4,6-trimethylphenyl)perylene3,4,9,10tetracarboxyldiimide.

5. An improved photoresponsive device in accordance with claim 1 wherein the perylene composition is N,N'-di(4-dimethylaminophenyl)perylene3,4,9,10tetracarboxyldiimide.

6. An improved photoresponsive device in accordance with claim 1 wherein the perylene composition is N,N'-di(2,6-dimethylphenyl)perylene3,4,9,10tetracarboxyldiimide.

7. An improved photoresponsive device in accordance with claim 2 wherein the perylene composition is N,N'-di(2-tertiarybutylphenyl)perylene3,4,9,10tetracarboxyldiimide.

8. An improved photoresponsive device in accordance with claim 2 wherein the perylene composition is N,N'-di(5-dichlorophenyl)perylene3,4,9,10tetracarboxyldiimide.

9. An improved photoresponsive device in accordance with claim 2 wherein the perylene composition is N,N'-di(2-methyl-4-chlorophenyl)perylene3,4,9,10tetracarboxyldiimide.

10. An improved photoresponsive device in accordance with claim 3 wherein the perylene composition is N,N'-di(2,6-dimethyl-4-tertiarybutylphenyl)-perylene3,4,9,10tetracarboxyldiimide.

11. An improved photoresponsive device in accordance with claim 3 wherein the perylene composition is N,N'-di(2,5-ditertiarybutylphenyl)perylene3,4,9,10tetracarboxyldiimide.

12. An improved photoresponsive device in accordance with claim 3 wherein the perylene composition is N,N'-di(2,4,6-trimethoxyphenyl)perylene3,4,9,10tetracarboxyldiimide.

13. A photoresponsive device in accordance with claim 2 wherein the supporting substrate is comprised of a conductive metallic substance, or an insulating polymeric composition.

14. A photoconductive device in accordance with claim 3 wherein the supporting substrate is comprised of a conductive metallic substance, or an insulating polymeric composition.

15. A photoresponsive device in accordance with claim 13 wherein the substrate is aluminum.

16. A photoresponsive device in accordance with claim 14 wherein the conductive substrate is aluminum.

17. An improved photoresponsive device in accordance with claim 1 wherein the perylene composition is dispersed in a resinous binder in an amount of from about 5 percent by volume to about 95 percent by volume, and the diamine hole transport material is dispersed in a resinous binder in an amount of from about 10 percent by weight to about 75 percent by weight.

18. An improved photoresponsive device in accordance with claim 2 wherein the perylene composition is dispersed in a resinous binder in an amount of from about 5 percent by volume to about 95 percent by volume, and the diamine hole transport material is dispersed in a resinous binder in an amount of from about 10 percent by weight to about 75 percent by weight.

19. An improved photoresponsive device in accordance with claim 17 wherein the resinous binder for the perylene composition is a polyester, polyvinylcarbazole, polyvinylbutyral, a polycarbonate, or a phenoxy resin, and the resinous binder for the diamine hole transport material is a polycarbonate, a polyester, or a vinyl polymer.

20. A photoresponsive device in accordance with claim 18 wherein the resinous binder for the perylene composition is a polyester, polyvinylcarbazole, polyvinylbutyral, polycarbonate, or a phenoxy resin, and the resinous binder for the diamine hole transport material is a polycarbonate, a polyester, or vinyl polymer.

21. A photoresponsive device in accordance with claim 3 wherein the diamine charge transporting substance composition comprises molecules of the formula:

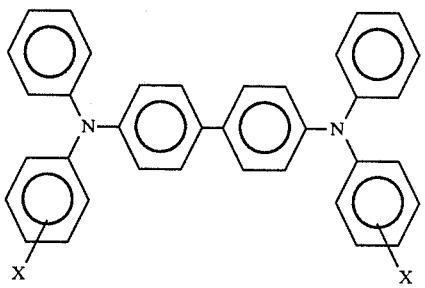

dispersed in a highly insulating and transparent organic resinous material wherein X is selected from the group consisting of ortho (CH₃), meta (CH₃), para (CH₃), ortho (Cl), meta (Cl), para (Cl).

22. A photoresponsive device in accordance with claim 2 wherein the diamine charge transporting diamine composition comprises molecules of the formula:

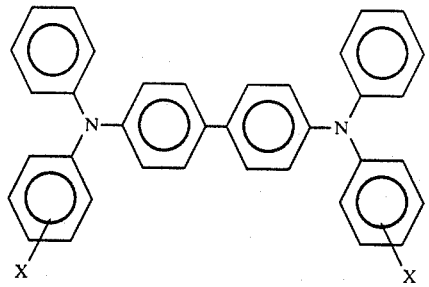

dispersed in a highly insulating and transparent organic resinous material wherein X is selected from the group consisting of ortho(CH₃), meta(CH₃), para(CH₃), ortho(Cl), meta(Cl), para(Cl).

23. a photoresponsive device in accordance with claim 21 wherein the diamine is comprised of N,N'-diphenyl-N,N'-bis(3-methylphenyl)-[1,1-biphenyl]-4,4'-diamine.

24. A photoresponsive device in accordance with claim 22 wherein the diamine is comprised of N,N'-diphenyl-N,N'-bis(3-methylphenyl)-[1,1-biphenyl]-4,4'-diamine.

25. An improved photoresponsive imaging member consisting essentially of a supporting substrate, a photoconductive layer comprised of the perylene compositions of claim 1, and a diamine hole transport layer containing molecules of the formula

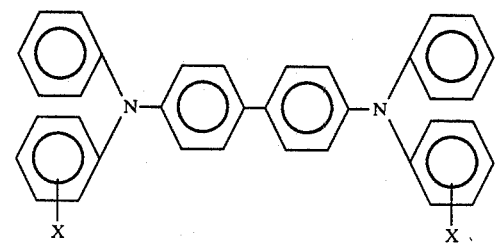

dispersed in a highly insulating and transparent organic resinous material wherein X is selected from the group consisting of ortho (CH₃), meta (CH₃), para (CH₃), ortho (Cl), meta (Cl) and para (Cl).

26. A photoresponsive imaging member in accordance with claim 25 wherein the perylene dye is selected from the group consisting of N,N'-di(2,4,6,-trimethylphenyl)perylene3,4,9,10tetracarboxylidiimide; N,N'-di(4,-dimethylaminophenyl)perylene3,4,9,10tetracarboxyldiimide; N,N'-di(2,6-dimethylphenyl)-perylene3,4,9,10tetracarboxyldiimide; N,N'-di(2-tertiarybutylphenyl)perylene3,4,9,10tetracarboxyldiimide; N,N'-di(5-dichlorophenyl)perylene3,4,9,10tetracarboxyldiimide; N,N'-di(2-methyl-4-chlorophenyl)-perylene3,4,9,10tetracarboxyldiimide; N,N'-di(2,6-dimethyl-4-tertiarybutylphenyl)perylene3,4,9,10tetracarboxyldiimide; and N,N'-di(2,5-ditertiarybutylphenyl)perylene3,4,9,10tetracarboxyldiimide.

* * * * *